(12) United States Patent
Katagiri et al.

(10) Patent No.: US 8,665,738 B2
(45) Date of Patent: Mar. 4, 2014

(54) TRANSMISSION APPARATUS AND SIGNAL TRANSMISSION METHOD

(75) Inventors: Toru Katagiri, Kawasaki (JP); Hiroyuki Honma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/047,083

(22) Filed: Mar. 14, 2011

(65) Prior Publication Data
US 2011/0229133 A1 Sep. 22, 2011

(30) Foreign Application Priority Data

Mar. 19, 2010 (JP) .................................. 2010-063541

(51) Int. Cl.
*H04L 12/26* (2006.01)
(52) U.S. Cl.
USPC .......... 370/252; 370/235; 370/357; 370/369; 370/375; 370/391; 360/51; 713/400
(58) Field of Classification Search
None
See application file for complete search history.

(56) References Cited

U.S. PATENT DOCUMENTS

| 7,020,094 B2 | 3/2006 | Heiles | |
|---|---|---|---|
| 2003/0123493 A1* | 7/2003 | Takahashi | 370/539 |
| 2010/0080562 A1* | 4/2010 | Perkins et al. | 398/98 |

FOREIGN PATENT DOCUMENTS

| EP | 1 376 966 | | 1/2004 | |
|---|---|---|---|---|
| EP | 2106051 | * | 9/2009 | ............... H04J 3/00 |
| EP | 2 228 930 | | 9/2010 | |
| JP | 2003-188919 | | 7/2003 | |
| WO | 92/02999 | | 2/1992 | |

OTHER PUBLICATIONS

Great Britain Search Report dated Jun. 24, 2011, from corresponding Great Britain Application No. GB1104355.1.

* cited by examiner

*Primary Examiner* — Ayaz Sheikh
*Assistant Examiner* — Nicholas Sloms
(74) *Attorney, Agent, or Firm* — Katten Muchin Rosenman LLP

(57) ABSTRACT

A transmission apparatus stores frame data of a first frame in a second frame having a bit rate different from that of the first frame through regulation of the amount of stuffs to be stored in the second frame. The transmission apparatus includes: a storage unit storing the first-frame frame data; a first control unit controlling a timing of writing the first-frame frame data in the storage unit based on first stuff information indicating the amount of stuffs contained in the first frame; an arithmetic and logic unit obtaining second stuff information indicating the amount of stuffs to be contained in the second frame based on a bit rate ratio between the first frame and the second frame; and a second control unit controlling a timing of reading out the first-frame frame data stored in the storage unit based on the second stuff information.

4 Claims, 10 Drawing Sheets

|  | j | r | ts | ODTUk.ts Payload bytes | ODTUk.ts Overhead bytes |
|---|---|---|---|---|---|
| ODTU2.ts | 476 | 32 | 1 to 8 | 15232 x ts | 7 x ts |
| ODTU3.ts | 119 | 128 | 1 to 32 | 15232 x ts | 7 x ts |
| ODTU4.ts | 95 | 160 | 1 to 80 | 15200 x ts | 6 x ts |

TRANSMISSION APPARATUS AND SIGNAL TRANSMISSION METHOD

CROSS-REFERENCE TO RELATED APPLICATIONS

This application is based upon and claims the benefit of priority of the prior Japanese Patent Application No. 2010-063541, filed on Mar. 19, 2010, the entire contents of which are incorporated herein by reference.

FIELD

The present invention relates to a transmission apparatus configured to execute cross-connect processing and a signal transmission method in an optical transmission network.

BACKGROUND

The SONET/SDH (Synchronous Optical Network/Synchronous Digital Hierarchy) has been standardized as a standard of the optical transmission technologies for implementing speeding-up of low-speed communication lines by hierarchically merging and multiplexing the low-speed communication lines.

The frame period in the SONET is set to be 125 μs. Further, the signal format and the like in the SONET are hierarchically defined as OC-n (Optical Carrier-level n). To date, the OC-n has been standardized up to OC-768.

On the other hand, the frame period in the SDH is set to be 125 μs similarly to the frame period in the SONET. Further, the signal format and the like in the SDH are hierarchically defined as STM-n (Synchronous Transport Module-level n). To date, the STM-n has been standardized up to STM-256.

Transmission speeds (i.e., bit rates) and the hierarchical structures of the SONET and the SDH are identical to each other where the level (n) of the OC-n is greater than or equal to 3 and the level (n) of the STM-n is greater than or equal to 1.

The relation between the frame period and the bit rate in the SONET/SDH will be explained with reference to FIG. 1. Specifically, FIG. 1A illustrates the relation between the frame period and the bit rate in OC-3. FIG. 1B illustrates the relation between the frame period and the bit rate in OC-12. FIG. 1C illustrates the relation between the frame period and the bit rate in OC-48. In FIG. 1, the vertical axis represents frame period whereas the horizontal axis represents bit rate.

As represented in FIGS. 1A through 1C, the frame size in the OC-n varies in accordance with values of n. Specifically, the OC-n frame size is expressed as "n×90×9" bytes. Further, the frame period in the SONET/SDH is constantly 125 μs regardless of values of n, as described above. Therefore, the bit rate of the OC-n is expressed as "n×51.84" Mbps.

On the other hand, the WDM-based OTN (Wavelength Division Multiplexing based Optical Transport Network) has been standardized as a platform for transparent transmission of a client signal. The term "client signal" herein refers to the OC-n and the STM-n in the SONET/SDH and the like. The frame structure of ODUk (Optical Channel Data Unit k) in OTUk (Optical Transport Unit k) defined for the OTN is equivalent to the frame structure of the OTUk excluding FEC (Forward Error Correction) and OH (Overhead).

The relation between the frame period and the bit rate in the ODUk will be hereinafter explained with reference to FIG. 2. In FIG. 2, the vertical axis represents frame period whereas the horizontal axis represents bit rate. FIG. 2 represents the relation between the frame period and the bit rate in ODU0, the ODU1 and the ODU2.

As represented in FIG. 2, the frame size of the ODUk is constantly "3824×4" bytes regardless of values of k. On the other hand, the frame period of the ODUk varies in accordance with values of k. For example, the frame period of the ODU0 is 98.35 μs. The frame period of the ODU1 is 48.97 μs. The frame period of the ODU2 is 12.19 μs. Therefore, the bit rate of the ODUk varies in accordance with values of k.

The bit rate of the ODU0 is 1244.16 Mbps. The bit rate of the ODU1 is 2498.78 Mbps (="1244.16×2×239/238" Mbps). The bit rate of the ODU2 is 10037.27 Mbps (="1244.16×8×239/237" Mbps). Although not represented in the figure, the bit rate of ODU3 is 40319.22 Mbps (="1244.16×32×239/236" Mbps). Further, the bit rate of ODU4 is 104794.45 Mbps (="1244.16×80×239/227" Mbps).

In association with the OTN, Japan Laid-open Patent Application Publication No. JP-A-2003-188919 discusses a cross-connect device configured to provide client signals with an exclusive line service through networks having different control systems (e.g., a plurality of carriers). The cross-connect device includes a mapping unit and a switching unit. The mapping unit is configured to map a client signal into the payload area of an OTN frame. The switching unit is configured to switch the frame that the client signal is mapped by the mapping unit in an ODUk sub-layer of an OTN layer.

As described above, the frame period of the OC-n in the SONET/SDH is constantly 125 μs regardless of values of n. Therefore, it is preferable to connect a plurality of cross-connect devices having a predetermined bit rate (of the OC-1, for instance) as a baseline for implementing a cross-connect processing of outputting a data signal to a different path in the OC-n with the TDM (Time Division Multiplexing) technique.

For example, a device herein assumed is a cross-connect device having the bit rate of the OC-1. In this case, a cross-connect processing is implemented for the OC-3 having a bit rate that is three times as fast as the bit rate of the OC-1 on a frame-by-frame basis through the parallel connection of three cross-connect devices intended for the OC-1.

In contrast, the frame periods of the ODUk in the OTN are not in an integral multiple relation. Specifically, the frame period of the ODU0 (i.e., 98.35 μs) is not obtained even if any one of the frame periods of the ODUk (k≥1) is multiplied with any one of integers, as described above. Unlike the case of the OC-n, it is difficult to implement a cross-connect processing in the ODUk with the TDM technique through the connection of a plurality of cross-connect devices having a baseline bit rate (of the ODU0, for instance). Consequently, different cross-connect devices are selectively used for different ODUk with different values of k in order to implement a cross-connect processing in the ODUk with the TDM technique.

SUMMARY

According to a first aspect of the present invention, a transmission apparatus is configured to store frame data of a first frame in a second frame having a bit rate different from a bit rate of the first frame through regulation of the amount of stuffs to be contained in the second frame. The transmission apparatus includes a storage unit, a first control unit, an arithmetic and logic unit and a second control unit. The storage unit is configured to store the frame data of the first frame. The first control unit is configured to control the timing of wiring the frame data of the first frame in the storage unit based on first stuff information indicating the amount of stuffs contained in the first frame. The arithmetic and logic unit is configured to obtain second stuff information indicating the amount of stuffs to be contained in the second frame based on a bit rate ratio between the first frame and the second frame. The second control unit is configured to control the timing of reading out the frame data of the first frame stored in the storage unit based on the second stuff information.

According to a second aspect of the present invention, a signal transmission method is configured to store frame data of a first frame in a second frame having a bit rate different from a bit rate of the first frame through regulation of the amount of stuffs to be contained in the second frame.

According to the transmission device and the signal transmission method of the aspects of the present invention, a cross-connect processing can be efficiently executed with respect to a plurality of frames having different periods in an optical transmission network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

Referring now to the attached drawings which form a part of this original disclosure.

DESCRIPTION OF EMBODIMENTS

First Exemplary Embodiment

A transmission apparatus of the present exemplary embodiment is configured to extract an ODUk signal from a network signal (e.g., an OTUk signal) to be inputted therein through a network. Further, the transmission apparatus of the present exemplary embodiment is configured to generate an ODUk signal from a client signal inputted therein from a client apparatus (e.g., a signal of the SONET format such as the OC-1, the OC-3, the OC-12 or the like, a signal of the Ethernet (registered trademark) format, and a signal of the Fibre Channel format). Simply put, a signal of the SONET format, the Ethernet format or the Fibre Channel format is mapped into an ODUk signal.

The transmission apparatus is subsequently configured to generate inner frames from the extracted or generated ODUk signal. The frame period and the bit rate of the respective inner frames are herein fixed regardless of values of k. The transmission apparatus is further configured to execute a cross-connect processing with the time division technique on an inner-frame by inner-frame basis. Further, the transmission apparatus is configured to generate an ODUk signal from the inner frames processed with the cross-connect processing through an ODTU signal using the GMP (Generic Mapping Procedure), and output the generated signal to the network, the client apparatus and the like. An example signal to be outputted to the network is herein an OTUk signal. Further, an example signal to be outputted to the client apparatus is a signal of the SONET format (e.g., the OC-3, the OC-12, the OC-48 or the like), the Ethernet format, the Fibre Channel format.

Figure 1A:
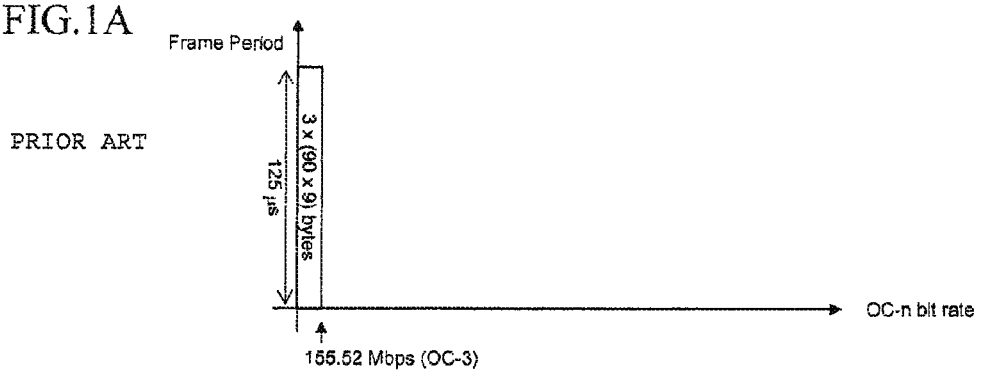
FIG. 1A is a chart representing the relation between the frame period and the bit rate in the OC-3.
Figure 1B:
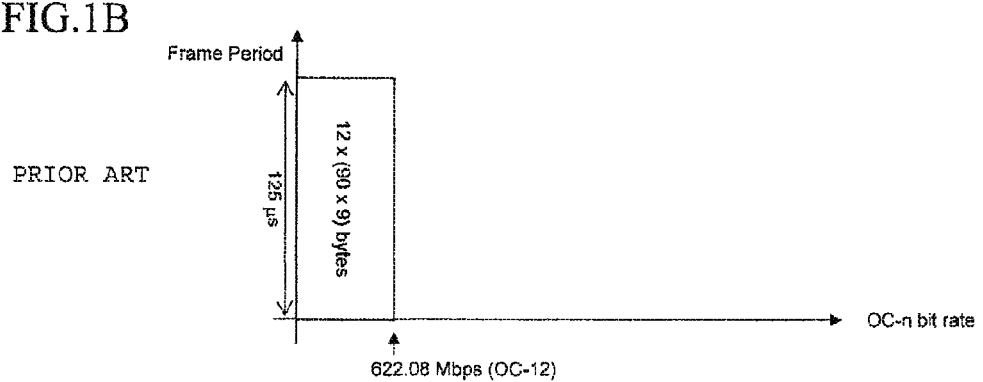
FIG. 1B is a chart representing the relation between the frame period and the bit rate in the OC-12.
Figure 1C:
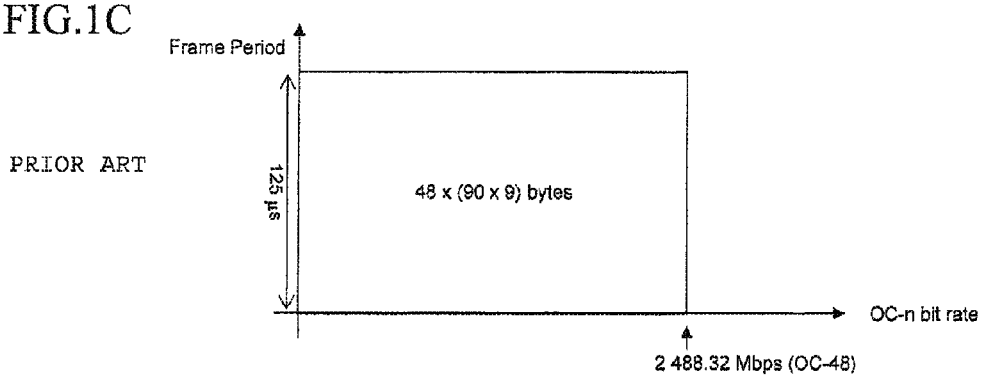
FIG. 1C is a chart representing the relation between the frame period and the bit rate in the OC-48.
Figure 2:
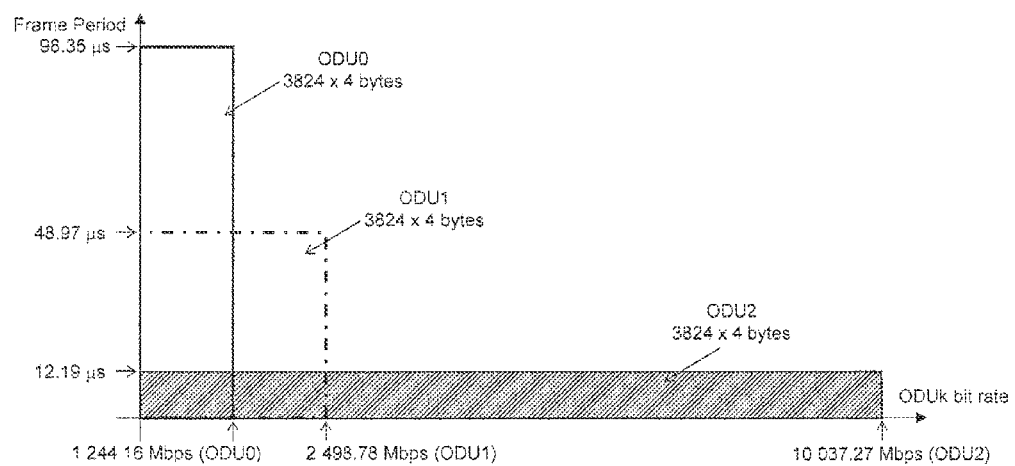
FIG. 2 is a chart representing the relation between the frame period and the bit rate in the ODUk.
Figure 3:
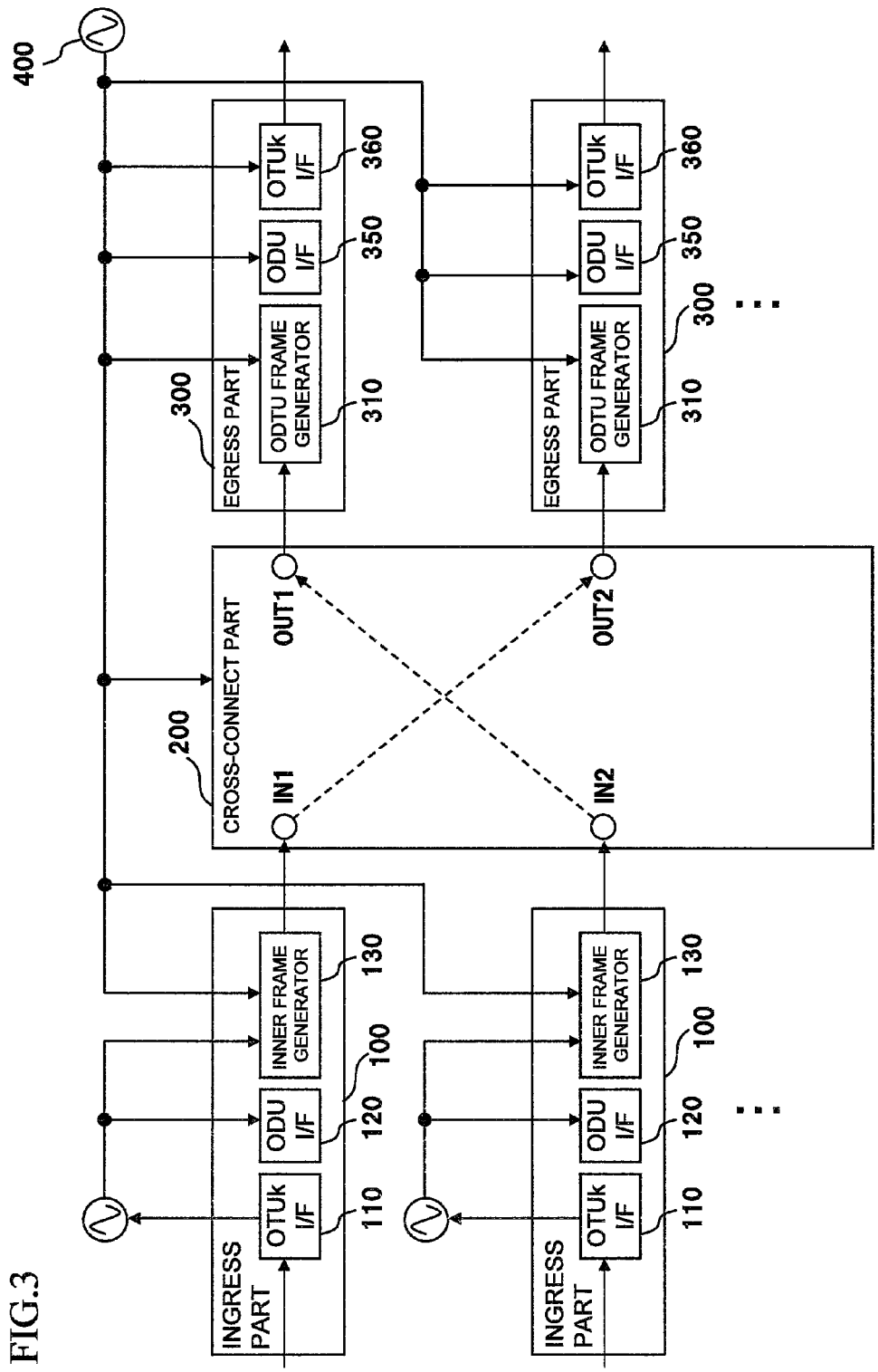
FIG. 3 is a diagram illustrating an exemplary schematic configuration of a transmission apparatus.

First, a schematic configuration of the transmission apparatus of the present exemplary embodiment will be hereinafter explained with reference to FIG. 3. FIG. 3 illustrates an exemplary schematic configuration of the transmission apparatus of the present exemplary embodiment. As illustrated in FIG. 3, the transmission apparatus of the present exemplary embodiment includes a plurality of ingress parts 100, a cross-connect part 200 and a plurality of egress parts 300.

First, the ingress parts 100 will be explained. As illustrated in FIG. 3, each ingress part 100 includes an OTUk interface 110, an ODU interface 120 and an inner frame generator 130.

The OTUk interface 110 is configured to receive the input of a network signal or a client signal. When receiving the input of an OTUk signal as a network signal, the OTUk interface 110 is configured to terminate and remove the overhead and the FEC from the inputted OTUk signal. An ODUk signal is generated as a result of removal of the overhead and the FEC from the OTUk signal. The generated ODUk signal is provided to the ODU interface 120.

Further, the OTUk interface 110 is configured to extract a clock from the inputted network/client signal and provide the extracted clock to the ODU interface 120 and the inner frame generator 130.

When an ODUj signal (j<k), having a bit rate lower than that of an ODUk signal, is multiplexed into an ODUk signal, the ODU interface 120 is configured to extract the multiplexed ODUj signal from the ODUk signal provided from the OTUk interface 110. The extracted ODUj signal is provided to the inner frame generator 130.

It is herein noted that the ODU interface 120 is configured to provide an ODUk signal provided thereto to the frame generator 130 without executing any processing to the ODUk signal when the ODUk signal includes a client signal.

The inner frame generator 130 is configured to map the ODU signal provided thereto from the ODU interface 120 into a single or plurality of inner frames respectively having a fixed frame period and a fixed bit rate based on a predetermined clock. The clock herein used as a baseline is configured to be provided by a system clock 400.

Figure 4A:
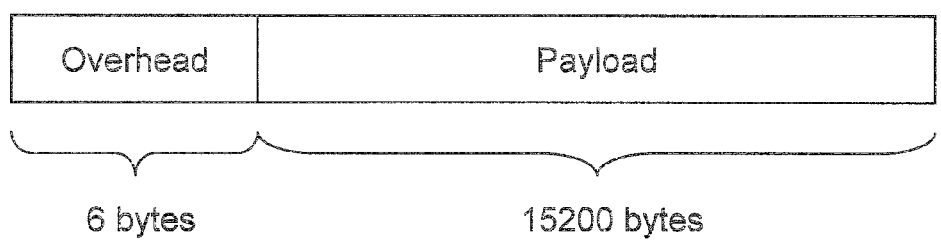
FIG. 4A is a diagram illustrating an exemplary frame structure of an inner frame.
Figure 4B:
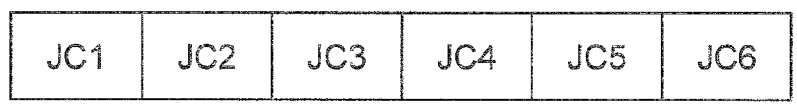
FIG. 4B is a diagram illustrating an exemplary overhead structure of the inner frame.

The frame structure of the inner frame will be hereinafter explained with reference to FIG. 4. The inner frame of the present exemplary embodiment corresponds to ODTU4.ts. FIG. 4A is a diagram illustrating an exemplary frame structure of the inner frame. FIG. 4B is a diagram illustrating an exemplary structure of the overhead of the inner frame. As illustrated in FIG. 4A, the inner frame of the present exemplary embodiment includes an overhead of 6 bytes and a payload of 15,200 bytes. The bit rate of the inner frame (i.e., the bit rate of the payload) of the present exemplary embodiment is 1.301 Gbps. The frame period of the inner frame is 93.42 μs. The frame period of the inner frame is eighty times as long as that of the ODU4. The payload of the inner frame stores data and stuffs on a byte unit basis.

Further, the overhead of the inner frame of the present exemplary embodiment illustrated in FIG. 4B stores the information indicating the amount of data or the amount of stuffs to be contained in the inner frame. In a specific example, the overhead of the inner frame of the present exemplary embodiment stores the information indicating the amount of data to be stored in the payload of the inner frame. The information is equivalent to the justification overhead (JC1 to JC6) of the ODTU4.ts.

Figure 5:
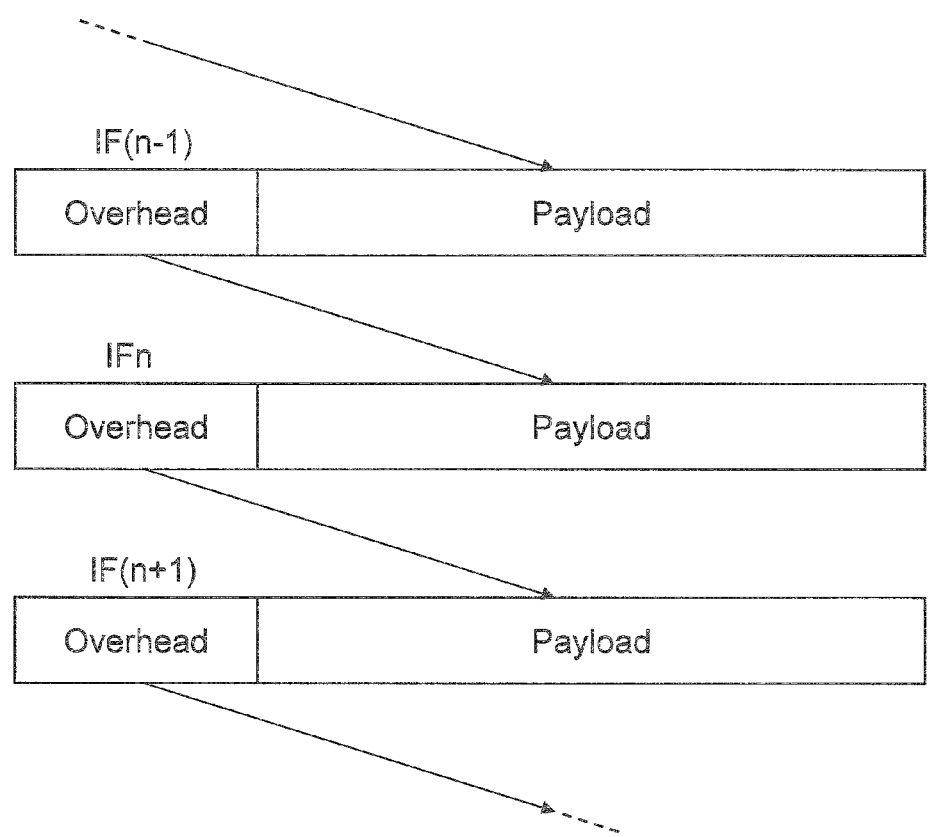
FIG. 5 is a diagram illustrating an exemplary relation between the information to be stored in the overheads of the inner frames and the information to be stored in the payloads of the inner frames.

Information to be stored in the overhead of the inner frame of the present exemplary embodiment will be hereinafter explained with reference to FIG. 5. FIG. 5 is a diagram illustrating an exemplary relation between the information to be stored in the overheads of the inner frames of the present exemplary embodiment and the information to be stored in the payloads of the inner frames of the present exemplary embodiment. In the present exemplary embodiment, the overhead of an (n−1)-th inner frame IF(n−1) stores the information for specifying a mapping position of data/stuffs in the payload of an n-th inner frame IFn, as illustrated in FIG. 5. In the present exemplary embodiment, the overheads of all the inner frames store the information for specifying the data mapping positions in the payloads.

Figure 6:
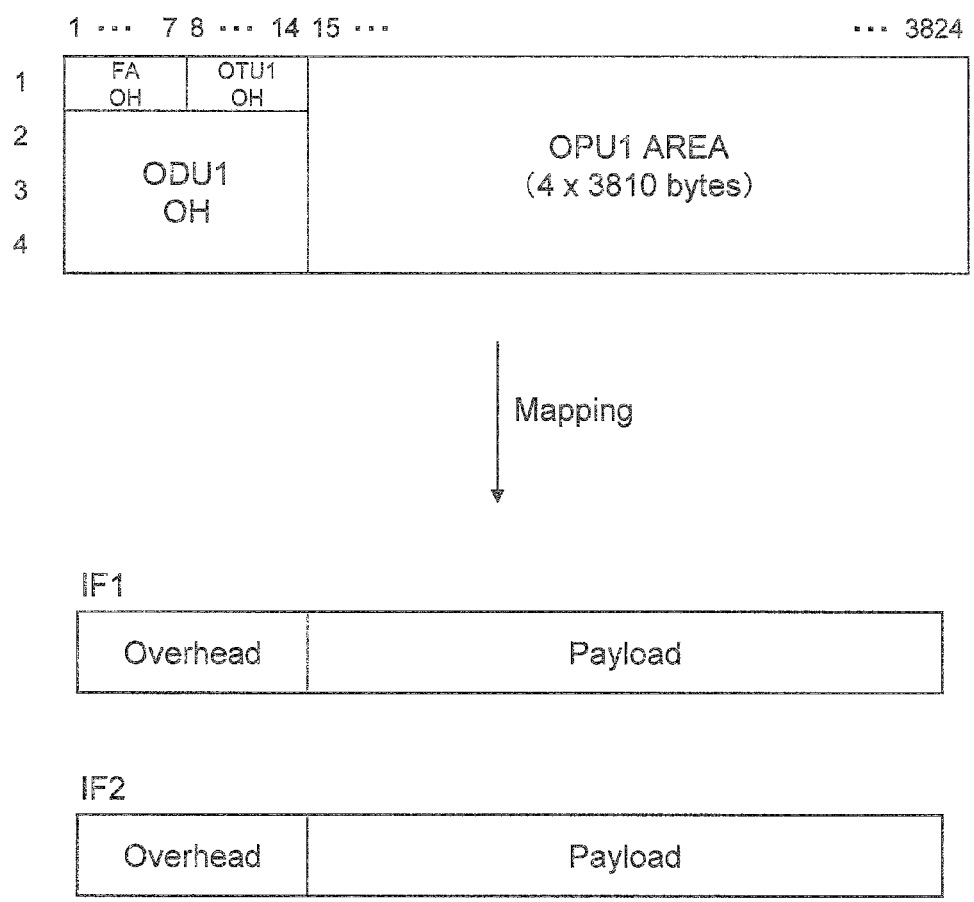
FIG. 6 is a diagram illustrating exemplary mapping into the inner frames.

With reference to FIG. 6, a case will be hereinafter explained that the inner frame generator 130 maps an ODU1 signal in two inner frames. FIG. 6 is a diagram illustrating an exemplary mapping processing executed by the inner frame generator 130 for mapping the ODU1 signal into the inner frames. An upper part of FIG. 6 illustrates the frame structure of the ODU1 signal. In the example illustrated in FIG. 6, the inner frame generator 130 is configured to map the ODU1 signal into two inner frames, i.e., an inner frame IF1 and an inner frame IF2. The GMP technique is used for the mapping processing. The GMP technique is a technique for mapping data between frames of different bit rates. In the GMP technique, a bit rate difference is regulated between a frame signal as a mapping source and a frame payload area as a mapping destination by means of stuffs. Using the GMP technique, it is possible to eliminate a difference between the frequency of a clock extracted from the network/client signal inputted into the OTUk interface 110 and the frequency of a clock provided from the system clock 400. For example, a method described in the specification of U.S. Pat. No. 7,020,094 is used as the method of regulating a bit rate difference with the GMP technique.

Further, mapping into two inner frames may be executed with, for instance, 2-byte granularity.

The inner frame generator 130 thus generates two inner frames from the ODU1 signal in the example illustrated in FIG. 6.

The inner frames, generated by the inner frame generator 130, are provided to the cross-connect part 200.

The number of the inner frames to be generated by the inner frame generator 130 may be set as any suitable number as long as data transmission is allowed using the inner frame/ frames having a predefined frame period and a predefined bit rate. For example, the inner frame generator 130 may be configured to generate an inner frame from an ODU0 signal, two inner frames from an ODU1 signal, eight inner frames from an ODU2 signal, 31 inner frames from an ODU3 signal, and 80 inner frames from an ODU4 signal.

Next, the cross-connect part 200 will be hereinafter explained with reference back to FIG. 3. The cross-connect part 200 is configured to execute a cross-connect processing on an inner-frame to inner-frame basis by means of the time division technique based on a clock provided from the system clock 400. The cross-connect part 200 includes a plurality of input ports INn and a plurality of output ports OUTn. The cross-connect part 200 is configured to output an inner frame to be inputted into a predetermined input port INn from a predetermined output port OUTn at a predefined frame frequency of the inner frame by means of the time division technique. In some cases, an external network control apparatus, installed outside of the present apparatus, is allowed to set the cross-connect part 200 to have the relational settings between the input ports receiving the input of the respective inner frames and the output ports outputting the inputted inner frames processed with the cross-connect processing. When a given inner frame, inputted into a given input port INn, stores in the overhead thereof the information of a predetermined output port OUTn where the inner frame is to be outputted, the cross-connect part 200 is configured to output the inner frame from the predetermined output port OUTn based on the information stored in the overhead of the inner frame.

In the transmission apparatus of the present exemplary embodiment, the frame period and the bit rate of an inner frame to be inputted into a given inner port INn of the cross-connect part 200 are fixed regardless of values of k. Therefore, a cross-connect processing can be executed for ODUk signals having different frame periods and bit rates without providing switches corresponding to different values of k.

Next, the egress parts 300 will be hereinafter explained. As illustrated in FIG. 3, each egress part 300 includes an ODTU frame generator 310, an ODU interface 350 and an OTUk interface 360.

Figure 7:
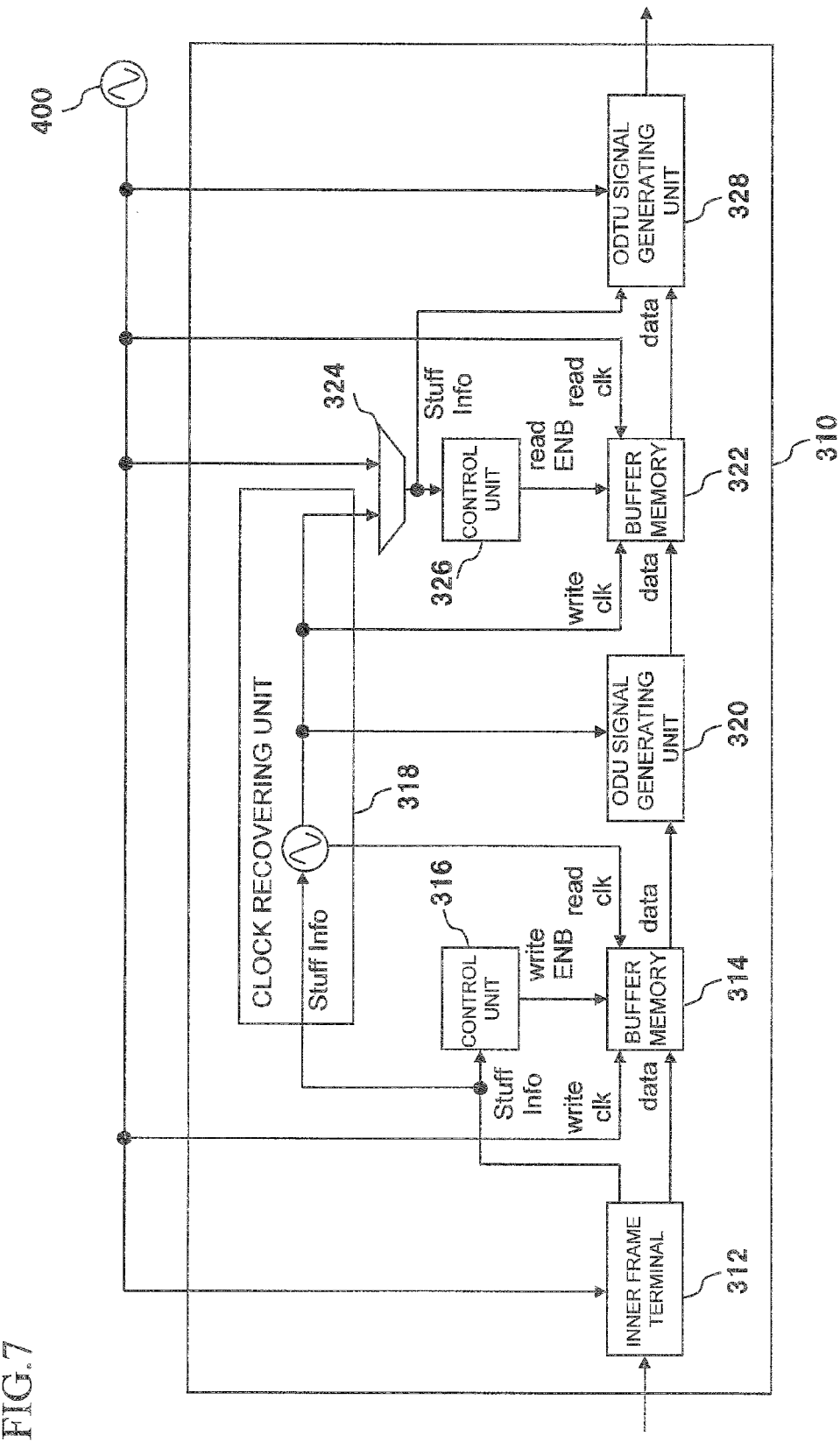
FIG. 7 is a schematic diagram illustrating an exemplary ODTU frame generator.

First, the ODTU frame generator 310 will be hereinafter explained. The ODTU frame generator 310 is configured to generate an ODTU frame based on an inner frame provided from the cross-connect part 200. For example, the ODTU frame generator 310 is configured to eliminate a bit rate difference between different frames using a method described in the specification of U.S. Pat. No. 7,020,094. The configuration of the ODTU frame generator 310 will be hereinafter explained with reference to FIG. 7. FIG. 7 is a configuration diagram of an exemplary ODTU frame generator 310. As illustrated in FIG. 7, the ODTU frame generator 310 of the present exemplary embodiment includes an inner frame terminal 312, a buffer memory 314, a control unit 316, a clock recovering unit 318, an ODU signal generating unit 320, a buffer memory 322, a frequency comparing unit 324, a control unit 326 and an ODU signal generating unit 328.

The buffer memory 314 herein corresponds to a second buffer memory unit PS2 illustrated in FIG. 4 of the specification of U.S. Pat. No. 7,020,094. Further, the control unit 316 and the clock recovering unit 318 correspond to components of a second transmission unit UE2 excluding the second buffer memory unit PS2 illustrated in FIG. 4 of the specification of U.S. Pat. No. 7,020,094.

Further, the buffer memory 322 corresponds to a first buffer memory unit PS1 illustrated in FIG. 3 of the specification U.S. Pat. No. 7,020,094. Yet further, the frequency comparing unit 324 and the control unit 326 correspond to components of a first transmission unit UE1 excluding the first buffer memory unit PS1 illustrated in FIG. 3 of the specification of U.S. Pat. No. 7,020,094.

First, the inner frame terminal 312 is configured to provide the buffer memory 314 with the data stored in the payload of a given received inner frame. Further, the inner frame terminal 312 is configured to extract either the information of the amount of the data stored in the payload of another inner frame ("data" in the figure), which is stored in the overhead of the received inner frame, or the information of the amount of the stuffs ("Stuff Info" in the figure) to be obtained from the information of the amount of the data. It is possible to specify the amount of the data and the amount of the stuffs contained in the payload based on the information of the amount of the data or the information of the amount of the stuffs (herein referred to as "stuff information") extracted by the inner frame terminal 312. The inner frame terminal 312 is configured to provide the stuff information to the control unit 316 and the clock recovering unit 318.

The buffer memory 314 is configured to execute data writing based on a clock ("write clk" in the figure) received from the system clock 400. Further, the buffer memory 314 is configured to receive the input of a writing enabling signal ("write ENB" in the figure) from the control unit 316. The data provided from the inner frame terminal 312 is written in the buffer memory 314 based on the clock outputted from the system clock 400 and the writing enabling signal outputted from the control unit 316.

Specifically, a bit rate difference between an inner frame and an ODU frame is eliminated by the stuffs to be inserted in accordance with the writing enabling signal outputted from the control unit 316.

The control unit 316 is configured to receive the input of the stuff information provided from the inner frame terminal 312. Based on the stuff information, the control unit 316 is configured to provide the buffer memory 314 with a writing enabling signal for determining the timing of writing the data provided from the inner frame terminal 312.

The clock recovering unit 318 is configured to receive the input of the stuff information provided from the inner frame terminal 312. Based on the stuff information, the clock recovering unit 318 is configured to generate a clock ("read clk" in the figure) for reading out the data stored in the payload of a given inner frame. The clock, generated by the clock recovering unit 318, is provided to the buffer memory 314.

The data, stored in the buffer memory 314, is read out to the ODU signal generating unit 320 based on the clock generated by the clock recovering unit 318. An ODU signal is thus generated from a given inner frame.

As described above, a bite rate difference between an inner frame and an ODU frame is eliminated by the buffer memory 314.

Next, the ODU signal generating unit 320 is configured to provide the buffer memory 322 with the ODU signal ("data" in the figure) read out from the buffer memory 314.

The buffer memory 322 is configured to execute data writing based on a clock ("write clk" in the figure) received from the clock recovering unit 318. The data, provided from the ODU signal generating unit 320, is written in the buffer memory 322 based on the clock outputted from the clock recovering unit 318.

The frequency comparing unit 324 is configured to receive the input of clocks from the clock recovering unit 318 and the system clock 400. The frequency comparing unit 324 is configured to calculate a ratio between the clocks inputted from the clock recovering unit 318 and the system clock 400. The ratio between frequencies calculated by the frequency comparing unit 324 corresponds to either the amount of the data contained in an ODTU frame or the information indicating the mount of the stuffs (stuff information) to be obtained from a difference between the amount of the data contained in the ODTU frame and the amount of the data stored in the payload area of the ODTU frame. The frequency comparing unit 324 is configured to provide the control unit 326 and the ODTU signal generating unit 328 with either the amount of the data or the amount of the stuffs (stuff information).

The control unit 326 is configured to provide the buffer memory 322 with a read-out enabling signal for determining the timing of reading out the data written in the buffer memory 322 based on either the amount of the data or the amount of the stuff (stuff information) provided from the frequency comparing unit 324.

The buffer memory 322 is configured to execute data reading based on a clock ("read clk" in the figure) received from the system clock 400. Further, the buffer memory 322 is configured to receive the input of a read-out enabling signal ("read ENB" in the figure) from the control unit 326. The data, written in the buffer memory 322, is read out based on the clock outputted from the system clock 400 and the read-out enabling signal outputted from the control unit 326.

Specifically, a bite rate difference between an ODU frame and an ODTU frame is eliminated by reading out a data signal in accordance with the read-out enabling signal outputted from the control unit 326.

The data, read out from the buffer memory 322, is provided to the ODTU signal generating unit 328. The ODTU signal generating unit 328 is configured to generate an ODTU signal based on the data provided from the buffer memory 322 and either the amount of the data or the amount of the stuff (stuff information) provided from the frequency comparing unit 324.

As explained above, a bit rate difference between an ODU frame and an ODTU frame is eliminated by the buffer memory 322.

Figures 8A, 8B:
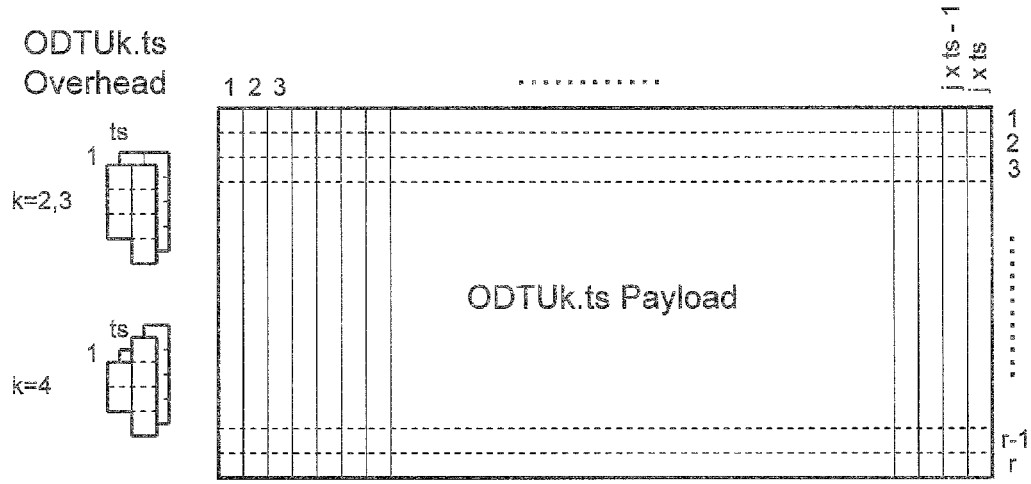
FIG. 8A is a diagram illustrating an exemplary frame structure of the ODTUk.ts.
FIG. 8B is a table summarizing an exemplary frame characteristic of the ODTUk.ts.

The frame structure of an ODTU signal will be hereinafter explained with reference to FIGS. 8A and 8B. FIGS. 8A and 8B are diagram and table illustrating the frame structure of the ODTUk.ts. As illustrated in FIG. 8A, the overhead of the ODTUk.ts contains "7×ts" bytes where k=2, 3, whereas the overhead of the ODTUk.ts contains "6×ts" bytes where k=4. Further, the payload of the ODTUk.ts contains "15232×ts" bytes where k=2, 3, whereas the payload of the ODTUk.ts contains "15200×ts" bytes where k=4. The number of rows and the number of columns of the payload are determined by a table represented in FIG. 8B.

The ODTU signal generating unit 328 is configured to provide a generated ODTU signal to the ODU interface 350.

As described above, the ODTU frame generator 310 is configured to eliminate a bit rate difference between an inner frame and an ODU frame using the buffer memory 314. Further, the ODTU frame generator 310 is configured to eliminate a bit rate difference between an ODU frame and an ODTU frame using the buffer memory 322. Thus, the ODTU frame generator 310 is configured to generate an ODTU frame based on an inner frame provided from the cross-connect part 200.

With reference back to FIG. 3, the ODU interface 350 will be hereinafter explained. The ODU interface 350 is configured to generate an ODU signal based on the ODTU signal provided from the ODTU signal generating unit 328. Further, the ODU interface 350 is configured to generate an ODUk signal having a bit rate faster than that of an ODUj signal (j<k)

by multiplexing the ODUj signal. Further, the ODU interface 350 is configured to provide the generated ODUk signal to the OTUk interface 360.

The OTUk interface 360 is configured to output a network/client signal based on the ODUk signal provided from the ODU interface 350. The OTUk interface 360 is configured to generate an OTUk signal by adding an overhead and an FEC to the ODUk signal provided from the ODU interface 350.

In the present exemplary embodiment, as described above, the inner frame generator 130 is configured to map an ODU signal inputted therein from the ODU interface 120 into a single or plurality of inner frames respectively having a fixed frame period and a fixed bit rate based on a predetermined clock. It is thereby possible to efficiently execute a cross-connect processing with respect to a plurality of frames (of e.g., an ODUk signal) that the frame period thereof varies in accordance with values of k.

Further in the present exemplary embodiment, the buffer memory 314 is configured to eliminate a bit rate difference between an inner frame and an ODU frame. Yet further, the buffer memory 322 is configured to eliminate a bit rate difference between an ODU frame and an ODTU frame. It is thereby possible to generate an ODTU frame based on a frame processed with a cross-connect processing.

Second Exemplary Embodiment

In the aforementioned first exemplary embodiment, the ODU signal generating unit 320 generates an ODU signal based on the data provided from the inner frame terminal 312, and the ODTU signal generating unit 328 subsequently generates an ODTU signal based on the generated ODU signal. The ODTU frame generator 310 of the present exemplary embodiment is configured to directly generate an ODTU signal based on the data provided from the inner frame terminal 312.

The transmission apparatus of the present exemplary embodiment includes the ODTU frame generator 310 having a configuration different from that of the ODTU frame generator 310 of the transmission apparatus of the first exemplary embodiment. However, the other components of the transmission apparatus of the present exemplary embodiment are the same as those of the transmission apparatus of the first exemplary embodiment.

Figure 9:
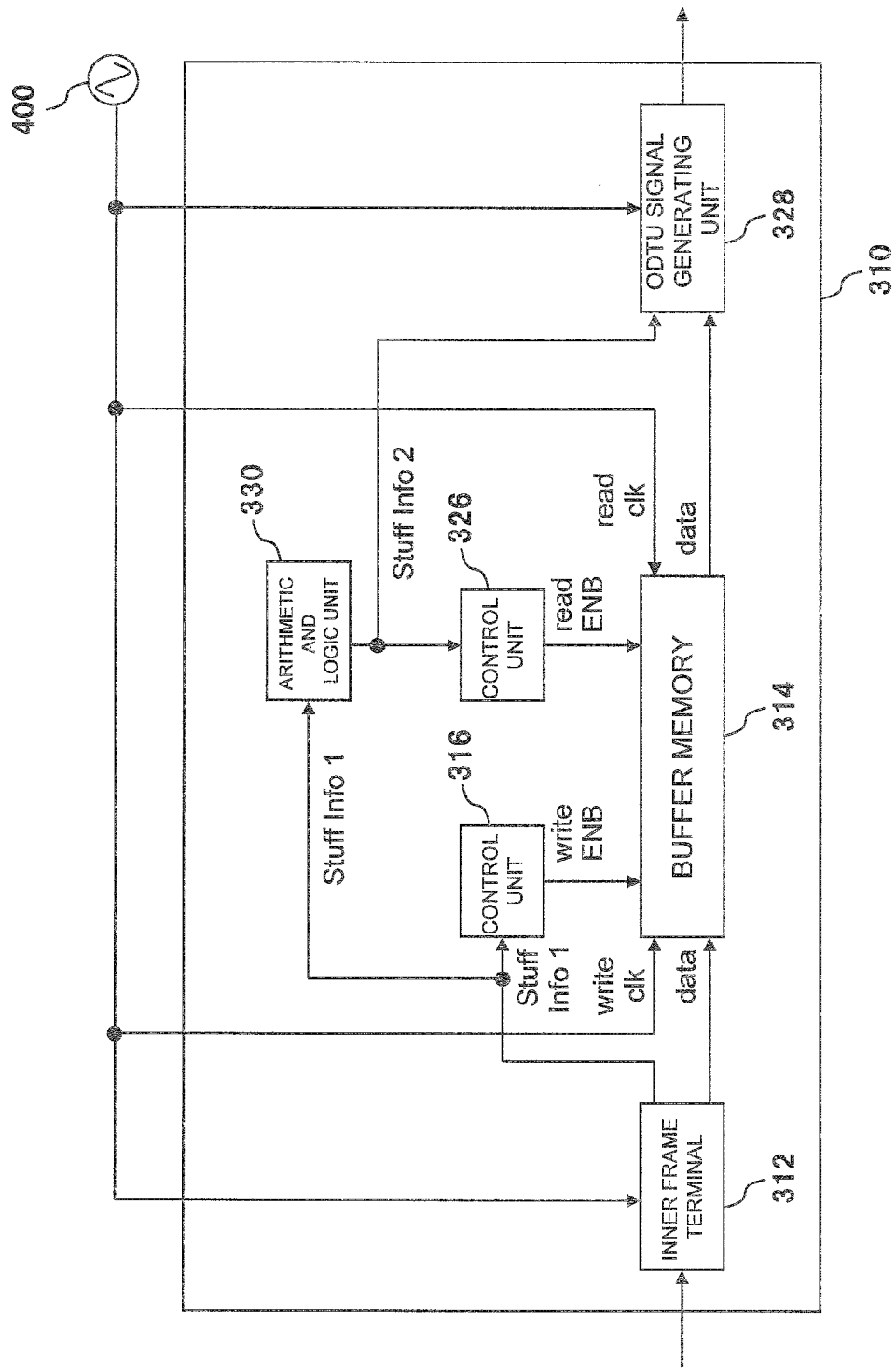
FIG. 9 is a configuration diagram illustrating an exemplary ODTU frame generator.

The ODTU frame generator 310 of the present exemplary embodiment will be hereinafter explained with reference to FIG. 9. FIG. 9 is a configuration diagram illustrating an example ODTU frame generator 310 of the present exemplary embodiment. As illustrated in FIG. 9, the ODTU frame generator 310 of the present exemplary embodiment includes an inner frame terminal 312, a buffer memory 314, a control unit 316, a control unit 326, an ODTU signal generating unit 328 and an arithmetic and logic unit 330.

The inner frame terminal 312 is configured to provide the buffer memory 314 with the data stored in the payload of a given inner frame ("data" in the figure). Further, the inner frame terminal 312 is configured to extract the information stored in the overhead of the inner frame (i.e., first stuff information: "Stuff Info 1" in the figure). It is possible to specify the amount of stuffs contained in the payload based on the first stuff information extracted by the inner frame terminal 312. When the amount of the data contained in the payload is stored as the first stuff information, it is also possible to obtain the amount of the stuffs by calculating difference between the mount of the data contained in the payload and the total amount of the data containable in the payload area. The inner frame terminal 312 is configured to provide the first stuff information to the control unit 316 and the arithmetic and logic unit 330.

The buffer memory 314 is configured to execute data writing based on a clock outputted from the system clock 400 ("write clk" in the figure). Further, the buffer memory 314 is configured to receive the input of a writing enabling signal ("write ENB" in the figure) from the control unit 316. The data, provided from the inner frame terminal 312, is written in the buffer memory 314 based on the clock outputted from the system clock 400 and the writing enabling signal inputted therein from the control unit 316.

The control unit 316 is configured to receive the input of the first stuff information provided from the inner frame terminal 312. Based on the first stuff information, the control unit 316 is configured to provide the buffer memory 314 with the writing enabling signal for determining the timing of writing the data provided from the inner frame terminal 312.

The arithmetic and logic unit 330 is configured to obtain the information to be stored in the overhead of an ODTU frame (i.e., second stuff information: "Stuff Info 2" in the figure) based on the first stuff information provided from the inner frame terminal 312. The amount of bits $C_{IF}$ (i.e., the first stuff information) of an ODUj signal to be contained in the payload of an inner frame is expressed by the following EQUATION (1), where the frequency of an ODUj signal is set as $f_{ODUj}$; the frequency of an inner frame is set as $f_{IF}$; and the amount of bits of an inner frame is set as $B_{IF}$.

EQUATION (1):

$$C_{IF} = \frac{f_{ODUj}}{f_{IF}} \cdot \frac{B_{IF}}{n} \tag{1}$$

In the above EQUATION (1), n is a unit for indicating the data amount expressed by $C_{IF}$. Further, n expresses a bit unit where n=1, whereas n expresses a byte unit where n=8.

Based on the following EQUATION (2), the arithmetic and logic unit 330 is configured to obtain the amount of bits $C_{ODTU}$ (i.e., the second stuff information) to be contained in the payload of an ODTU frame using a conversion constant α depending on frames to be outputted to the ODU interface 350.

EQUATION 2:

$$C_{ODTU} = C_{IF} \times \alpha \tag{2}$$

The conversion constant α in the aforementioned EQUATION (2) is represented in the following TABLE 1.

TABLE 1

| INNER FRAME | OUTPUT FRAME | CONVERSION CONSTANT α |
| --- | --- | --- |
| CORRESPONDING TO ODTU4.ts | ODU1/OTU1 | 238/227 |
| | ODU2/OTU2 | 237/227 |
| | ODU3/OTU3 | 236/227 |
| | ODU4/OTU4 | 1 |

TABLE 1-continued

| INNER FRAME | OUTPUT FRAME | CONVERSION CONSTANT α |
|---|---|---|
| CORRESPONDING TO ODTU3.ts | ODU1/OTU1 | 238/236 |
|  | ODU2/OTU2 | 237/236 |
|  | ODU3/OTU3 | 1 |
| CORRESPONDING TO ODTU2.ts | ODU1/OTU1 | 238/237 |
|  | ODU2/OTU2 | 1 |
| CORRESPONDING TO ODTU1.ts | ODU1/OTU1 | 1 |

For example, the conversion constant α is equal to 237/227 where an inner frame payload area corresponds to the ODTU4.ts and a frame to be outputted to the ODU interface 350 is the ODU2. Meanwhile, the conversion constant α is equal to 1 where the inner frame payload area corresponds to the ODTU4.ts and the frame to be outputted to the ODU interface 350 is the ODU4. The conversion constant α is associated with a bit rate ratio between an inner frame and an output frame.

The arithmetic and logic unit 330 is configured to provide the second stuff information to the control unit 326 and the ODTU signal generating unit 328.

The control unit 326 is configured to provide the buffer memory 314 with a read-out enabling signal ("read ENB" in the figure) determining the timing of reading out the data written in the buffer memory 314 based on the second stuff information provided thereto from the arithmetic and logic unit 330.

The buffer memory 314 is configured to execute data reading based on a clock outputted from the system clock 400 ("read clk" in the figure). Further, the buffer memory 314 is configured to receive the input of the read-out enabling signal ("read ENB" in the figure) from the control unit 326. The data, written in the buffer memory 314, is read out based on the clock outputted from the system clock 400 and the read-out enabling signal inputted thereto from the control unit 326.

Specifically, a bit rate difference between an inner frame and an ODTU frame is eliminated by reading out the data depending on the read-out enabling signal inputted into the buffer memory 314 from the control unit 326.

The data, read out from the buffer memory 314, is provided to the ODTU signal generating unit 328. The ODTU signal generating unit 328 is configured to generate an ODTU signal based on the second stuff information provided thereto from the arithmetic and logic unit 330 and the data provided thereto from the buffer memory 314. The ODTU signal generating unit 328 is configured to provide the generated ODTU signal to the ODU interface 350.

In the transmission apparatus of the present exemplary embodiment, the arithmetic and logic unit 330 is configured to obtain the information indicating the amount of the stuffs to be contained in an ODTU frame based on a bit rate ratio between an inner frame and an ODTU frames, as described above. It is thereby possible to generate an ODTU frame directly from an inner frame without generating an ODU frame from the inner frame.

Consequently, the clock recovering unit and the frequency comparing unit used in the aforementioned exemplary embodiment may not be used in the present exemplary embodiment. Further, either of two buffer memories used in the aforementioned exemplary embodiment may not be used in the present exemplary embodiment. Simply put, the circuit configuration of the present exemplary embodiment is further simplified than that of the aforementioned first exemplary embodiment. Accordingly, power consumption can be reduced and signal delay can be inhibited.

Third Exemplary Embodiment

The aforementioned first exemplary embodiment has explained the case that the transmission apparatus is configured to generate an ODUk signal from an inner frame processed with a cross-connect processing through an ODTU signal by means of the GMP technique. However, the technique for generating an ODUk signal from an inner frame may not be limited to the GMP technique. In contrast, the present exemplary embodiment will explain a case that the transmission apparatus is configured to generate an ODUk signal from an inner frame processed with a cross-connect processing through an ODTU signal by means of the AMP (Asynchronous Mapping Procedure) technique.

The transmission apparatus of the present exemplary embodiment includes an ODTU frame generator 310 having a configuration different from that of the ODTU frame generator 310 of the second exemplary embodiment. However, the other components of the transmission apparatus of the present exemplary embodiment are the same as those of the transmission apparatus of the second exemplary embodiment excluding the ODTU frame generator 310.

Figure 10:
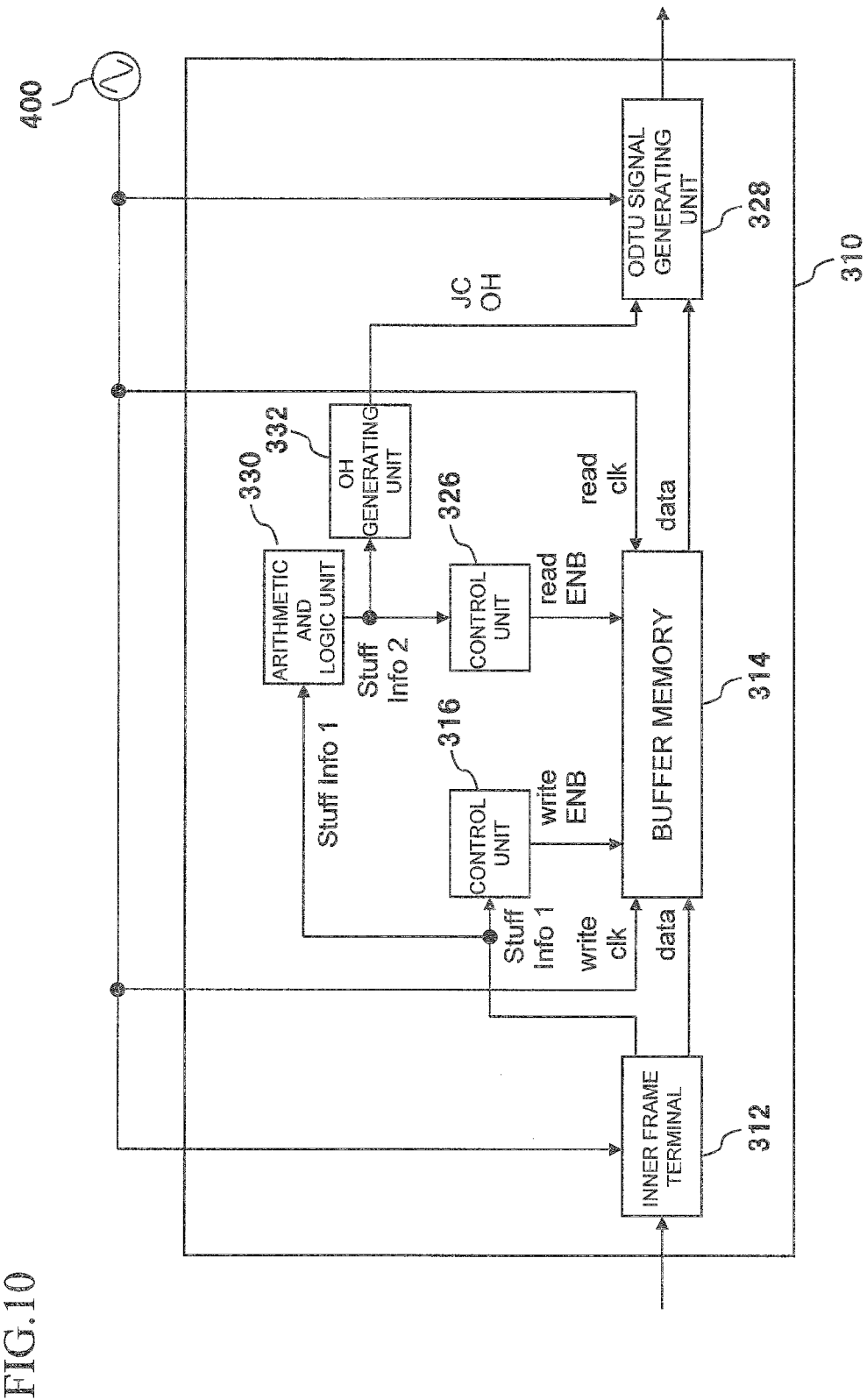
FIG. 10 is a configuration diagram illustrating an exemplary ODTU frame generator.

The ODTU frame generator 310 of the present exemplary embodiment will be hereinafter explained with reference to FIG. 10. FIG. 10 is a configuration diagram illustrating an exemplary ODTU frame generator 310 of the present exemplary embodiment. As illustrated in FIG. 10, the ODTU frame generator 310 of the present exemplary embodiment includes an inner frame terminal 312, a buffer memory 314, a control unit 316, a control unit 326, an ODTU signal generating unit 328, an arithmetic and logic unit 330 and an overhead generating unit 332.

Configurations of the inner frame terminal 312, the buffer memory 314, the control unit 316 and the control unit 326 are respectively the same as those of the second exemplary embodiment. Therefore, explanation thereof will be hereinafter omitted. The following explanation relates to component configurations different from those of the aforementioned second exemplary embodiment.

The arithmetic and logic unit 330 is configured to obtain the information indicating the amount of the stuffs contained in an ODTU frame (i.e., the second stuff information) based on the first stuff information provided from the inner frame terminal 312. The amount of bits $C_{IF}$ (i.e., the first stuff information) of an ODUj signal to be contained in the payload of an inner frame is expressed by the aforementioned EQUATION (1), where the frequency of an ODUj signal is set as $f_{ODUj}$; the frequency of an inner frame is set as $f_{IF}$; and the amount of bits of an inner frame is set as $B_{IF}$.

Based on the aforementioned EQUATION (2), the arithmetic and logic unit 330 is configured to obtain the amount of bits $C_{ODTU}$ (i.e., the second stuff information) to be contained in the payload of an ODTU frame using a conversion constant α depending on frames to be outputted to the ODU interface 350.

In the present exemplary embodiment, the conversion constant α in the aforementioned EQUATION (2) is represented in the following TABLES 2 and 3.

TABLE 2

| INNER FRAME | OUTPUT FRAME | INPUT FRAME | CONVERSION CONSTANT α | $C_{ODTU}$ | JC byte |
|---|---|---|---|---|---|
| CORRESPONDING TO ODTU4.ts | ODU1/OTU1 | ODU0 | 238/227 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | ODU2/OTU2 | ODU1 | 237/227 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | ODU3/OTU3 | ODU1 | 236/227 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | | ODU2 | 236/227 | 15169 | JC = 01 (−1, NJO) |
| | | | | 15168 | JC = 00 (±0) |
| | | | | 15167 | JC = 11 (+1, PJO1) |
| | | | | 15166 | JC = 10 (+2, PJO2) |
| | ODU4/OTU4 | N/A | N/A | N/A | |

TABLE 3

| INNER FRAME | OUTPUT FRAME | INPUT FRAME | CONVERSION CONSTANT α | $C_{ODTU}$ | JC byte |
|---|---|---|---|---|---|
| CORRESPONDING TO ODTU3.ts | ODU1/OTU1 | ODU0 | 238/236 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | ODU2/OTU2 | ODU1 | 237/236 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | ODU3/OTU3 | ODU1 | 236/236 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | | ODU2 | 236/236 | 15169 | JC = 01 (−1, NJO) |
| | | | | 15168 | JC = 00 (±0) |
| | | | | 15167 | JC = 11 (+1, PJO1) |
| | | | | 15166 | JC = 10 (+2, PJO2) |
| CORRESPONDING TO ODTU2.ts | ODU1/OTU1 | ODU0 | 238/237 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| | ODU2/OTU2 | ODU1 | 237/237 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |
| CORRESPONDING TO ODTU1.ts | ODU1/OTU1 | ODU0 | 238/238 | 15233 | JC = 01 (−1, NJO) |
| | | | | 15232 | JC = 00 (±0) |
| | | | | 15231 | JC = 11 (+1, PJO1) |
| | | | | 15230 | JC = 10 (+2, PJO2) |

For example, the conversion constant α is equal to 237/227 where an inner frame payload area corresponds to the ODTU4.ts; an input frame is the ODU1; and an output frame is the ODU2. In this case, the amount of bits $C_{ODTU}$ (i.e., the second stuff information) to be contained in the payload of an ODTU frame may be any value ranging from 15230 to 15233.

The arithmetic and logic unit 330 is configured to provide the second stuff information to the control unit 326 and the overhead generating unit 332.

The overhead generating unit 332 is configured to generate the overhead of an ODTU frame having an overhead length different from that of the overhead of an inner frame based on the second stuff information provided thereto from the arithmetic and logic unit 330. The structure of the overhead (JC) varies in the AMP technique. For example, under the condition that the inner frame payload area corresponds to the ODTU4.ts; the input frame is the ODU1; and the output frame is the ODU2, the value of JC will be set as: JC=−1 where $C_{ODTU}$ is 15233; JC=0 where $C_{ODTU}$ is 15232; JC=+1 where $C_{ODTU}$ is 15231; and JC=+2 where $C_{ODTU}$ is 15230.

The overhead ("JC OH" in the figure) generated by the overhead generating unit 332 is provided to the ODTU signal generating unit 328.

In the transmission apparatus of the present exemplary embodiment, as described above, the overhead generating unit 332 is configured to generate the overhead of an ODTU frame having an overhead length different from that of the overhead of an inner frame. Similarly to the second exemplary embodiment, the circuit configuration of the present exemplary embodiment is further simplified than that of the first exemplary embodiment. Therefore, power consumption can be reduced and signal delay can be inhibited.

The inner frame format and the ODTU frame format, described in the aforementioned exemplary embodiments, are only examples and are not limited thereto. Further, a variety of modifications and changes can be made for the aforementioned exemplary embodiments without departing from the scope of the present exemplary embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A transmission apparatus configured to store frame data of a first frame in a second frame having a bit rate different from a bit rate of the first frame through regulation of the amount of stuffs to be contained in the second frame, the transmission apparatus comprising:
    a first storage unit configured to store the frame data of the first frame;
    a first control unit configured to control a timing of writing the frame data of the first frame in the first storage unit based on first stuff information indicating the amount of stuffs contained in the first frame;
    a clock recovery unit configured to provide a read clock signal, which is generated based on the first stuff information, for reading the frame data from the first storage unit;
    an intermediate signal generator configured to generate an intermediate frame from the data read from the first storage unit;
    a second storage unit configured to store the frame data of the intermediate frame based on a write clock signal from the clock recovery unit;
    an arithmetic and logic unit configured to obtain second stuff information indicating the amount of stuffs to be contained in the second frame based on a bit rate ratio between the intermediate frame and the second frame; and
    a second control unit configured to control a timing of reading out the frame data stored in the second storage unit based on the second stuff information.

2. The transmission apparatus recited in claim 1, further comprising:
    an overhead generating unit configured to generate an overhead of the second frame based on the second stuff information, the overhead of the second frame having an overhead length different from an overhead length of an overhead of the first frame.

3. A signal transmission method of storing frame data of a first frame in a second frame having a bit rate different from a bit rate of the first frame through regulation of the amount of stuffs to be stored in the second frame, the signal transmission method comprising:
    storing the frame data of the first frame in a first storage unit,
    writing the frame data of the first frame based on first stuff information indicating the amount of stuffs contained in the first frame in the storing process;
    reading the frame data from the first storage unit in accordance with a read clock signal that is generated based on the first stuff information;
    generating an intermediate frame from the frame data read from the first storage unit;
    storing the frame data of the intermediate frame based on a write clock signal;
    obtaining second stuff information indicating the amount of stuffs to be contained in the second frame based on a bit rate ratio between the first intermediate frame and the second frame; and
    reading out the frame data of the intermediate frame based on the second stuff information.

4. The signal transmission method recited in claim 3, further comprising:
    generating an overhead of the second frame based on the second stuff information, the overhead of the second frame having an overhead length different from an overhead length of an overhead of the first frame.

* * * * *